United States Patent [19]

Karlock

[11] Patent Number: 5,402,488
[45] Date of Patent: Mar. 28, 1995

[54] METHOD AND APPARATUS FOR MODIFYING A VIDEO SIGNAL

[76] Inventor: James A. Karlock, 3311 NE. 35th Ave., Portland, Oreg. 97212

[21] Appl. No.: 752,841

[22] Filed: Aug. 30, 1991

[51] Int. Cl.$^6$ .................... G11B 15/04; H04N 7/087; H04N 5/76
[52] U.S. Cl. .......................... 380/5; 380/15; 360/37.1; 360/60; 348/476; 358/335
[58] Field of Search .............. 380/5, 15; 358/21 V, 358/335, 145; 360/37.1, 60, 15, 33.1

[56] References Cited

U.S. PATENT DOCUMENTS

| | | | |
|---|---|---|---|
| 2,268,001 | 12/1941 | Felgel-Farnholz | 178/5.6 |
| 2,303,968 | 12/1942 | White | 178/7.1 |
| 2,741,661 | 4/1956 | France | 178/7.1 |
| 2,823,252 | 2/1958 | Bridges | 178/5.1 |
| 2,885,470 | 5/1959 | Bartelink | 178/6.8 |
| 3,383,463 | 5/1968 | Goodell et al. | 178/7.5 |
| 3,423,520 | 1/1969 | Kelly | 178/5.6 |
| 3,466,387 | 9/1969 | Rout | 178/5.8 |
| 3,478,166 | 11/1969 | Reiter et al. | 178/5.1 |
| 3,538,243 | 11/1970 | Shanahan et al. | 178/5.1 |
| 3,749,831 | 7/1973 | Simpkins | 178/6.8 |
| 3,824,332 | 7/1974 | Horowitz | 178/5.1 |
| 4,163,253 | 7/1979 | Morio et al. | 358/120 |
| 4,631,603 | 12/1986 | Ryan | 360/37.1 |
| 5,133,008 | 7/1992 | Fujita | 380/5 |

FOREIGN PATENT DOCUMENTS 0196675  12/1982  Japan .................... 380/5

Primary Examiner—Gilberto Barrón, Jr.
Attorney, Agent, or Firm—Dellert and Walters

[57] ABSTRACT

A standard video signal is processed by including an interval of an insertion signal whose potential varies continuously between the video sync tip level and a level substantially above blanking level during at least part of the active interval of at least one blank line in the vertical blanking interval.

33 Claims, 8 Drawing Sheets

METHOD AND APPARATUS FOR MODIFYING A VIDEO SIGNAL

BACKGROUND OF THE INVENTION

This invention relates to a method of modifying a video signal. Applications of the method include preventing unauthorized recording of video signals, including unauthorized copying of pre-recorded videotapes, testing data decoders such as closed caption decoders and inserting visible text into a video display.

In the United States, a video signal that is broadcast for reception by a standard television receiver is composed of a succession of fields, each comprising a vertical blanking interval in which the signal level remains at or below a predetermined blanking level, and an active field interval, and each field is composed of a succession of lines, each comprising a horizontal blanking interval and an active line interval. Such a video signal is referred in the following description and in the ensuing claims as a "standard video signal".

Many prior devices have been used to modify a video signal during its blanking intervals.

U.S. Pat. No. 2,268,001 issued in 1941 to R. R. Von Felgel-Farnholz describes adding pulses just after the horizontal sync pulses. The amplitude of the pulses is about 30% of the black-to-white video range.

U.S. Pat. No. 2,303,968 issued in 1942 to White describes automatic gain control ("AGC") pulses starting at blanking level and extending to slightly greater than peak video amplitude. The AGC pulses are placed after the horizontal sync pulses and are used to control an automatic gain control in order to achieve a desired signal level.

U.S. Pat. No. 3,423,520 issued in 1969 to H. P. Kelly shows the addition of pulse pairs to blanking just before sync pulses.

U.S. Pat. No. 3,466,387 issued in 1969 to E. R. Rout describes the addition of bi-directional pulses to blanking after sync pulses. The pulses extend from below sync to about halfway through the black-to-white range.

U.S. Pat. No. 2,885,470 issued in 1959 to E. H. B. Bartelink shows the addition of square waves to one line in the vertical blanking interval. The range of the added square wave is from blanking to approximately peak white and is used for testing. Square waves having frequencies of 100 Khz, 1 MHz and 4 MHz are used.

U.S. Pat. No. 2,823,252 issued in 1958 to J. E. Bridges shows the addition of ". . . a burst of signal of frequency . . . ." FIG. 3J appears to show either a sawtooth or sine wave. FIG. 3O shows that they occupy seven lines in the vertical blanking interval and extend from blanking to approximately peak white.

U.S. Pat. No. 3,824,332 issued in 1974 to Horowitz shows the addition of low amplitude sine waves on a pedestal to eight lines in the back porch of vertical blanking.

U.S. Pat. No. 2,741,661 issued in 1956 to H. DeFrance shows the addition of sine waves between sync pulses and having a range from sync tip to blanking.

U.S. Pat. No. 3,478,166 issued in 1969 to A. M. Reiter et al. shows the addition of a sawtooth wave between sync pulses and having a range from sync tip to blanking.

U.S. Pat. No. 3,538,243 issued in 1970 to W. J. Shanahan et al shows the addition of 70 KHZ, 100 KHz and 150 KHz square waves between sync pulses and having a range from sync tip to blanking.

U.S. Pat. No. 3,383,463 issued in 1968 to W. F. Goodell et al shows the addition of a "noise signal" to the back porch of a video signal. The amplitude of the noise signal is greater than that of the overall video signal, extending from below sync to above peak white.

U.S. Pat. No. 3,749,831 issued in 1973 to Simpkins shows "digital sync pulses" and "digital code pulses" inserted during vertical sync pulses with an amplitude extending from sync tip to approximately peak white.

There are many known methods of modifying a standard video signal such that it cannot be recorded on a conventional videotape recorder, or can be recorded only in severely degraded form. All of these methods have been of limited effectiveness and usually have had serious side effects. The side effects that occur in playback can generally be attributed to design choices in the television receiver, such that receivers made by some manufacturers are more susceptible to a given side effect than those made by other manufacturers. For example, one early method involved modifying vertical synchronizing pulses, included in the video signal, and this caused the display provided by certain models of television receivers to jitter vertically while those of other manufacturers were less susceptible to this problem.

Other methods of modifying a video signal involved adding high level pulses to the video signal to cause improper operation of the automatic gain control found in many video cassette recorders (VCRs). For instance U.S. Pat. No. 4,163,253 entitled METHOD OF AND APPARATUS FOR MODIFYING A VIDEO SIGNAL TO PREVENT UNAUTHORIZED RECORDING AND REPRODUCTION THEREOF issued on Jul. 31, 1979 to Morio et al describes the addition of a high level positive pulse to the "back porch" of the horizontal blanking just after an ordinary horizontal sync pulse. The back porch is used in many television receivers for black setting, and such television receivers display a dark or extinguished picture when supplied with such video.

U.S. Pat. No. 4,631,603 entitled METHOD AND APPARATUS FOR PROCESSING A VIDEO SIGNAL SO AS TO PROHIBIT THE MAKING OF ACCEPTABLE VIDEO TAPE RECORDINGS THEREOF issued on Dec. 23, 1986 to Ryan adds not only high level positive pulses but also negative, or pseudo-sync, pulses. Since the positive pulses are added to the nominally blank lines that occur during the vertical blanking interval, they appear as retrace lines on many television receivers. Additionally, the pseudo-sync pulses cause some television sets to interpret the high level positive pulses as a normal back porch and cause darkening of the displayed picture. The added pseudo-sync pulses may also disturb the television set's phase-locked loop in the horizontal sweep, thereby causing a bend at the top of the picture.

SUMMARY OF THE INVENTION

It appears from the prior art discussed above that no one has ever added a continuous signal whose range is from the tip of sync to significantly above blanking level between the horizontal sync pulses that occur within the vertical blanking interval. As will be discussed below, such a signal can be used to confuse the AGC of an ordinary VCR and provide an effective alternative to the systems described above.

One object of the present invention is to provide an effective method for preventing the recording of video signals.

Another object of the present invention is to reduce the artifacts commonly associated with previous anti-copying methods.

Still another object of the invention is to provide a method of modifying a video signal to tailor it to the design of a television receiver, so that the display provided by a receiver of that design is substantially free of artifacts.

A further object of the present invention is to provide a flexible and easily changeable added waveform.

Another object of the invention is to provide a simple and versatile way of adding any desired waveform to a video signal.

The foregoing objects may be achieved by synchronizing a source of a continuous wave, whose frequency is greater than that of horizontal sync, with the horizontal sync of the incoming video signal, precisely matching the negative tips of the continuous wave with the incoming video signal, then inserting the continuous wave into the video signal either by summation (additive mixing) or by use of a selector switch. Normally the added wave falls between horizontal sync pulses that occur within the vertical blanking region.

The continuous wave varies in potential between the sync tip level and a level substantially above blanking level during at least part of the active interval of at least one blank line.

Suitable waves include sine, square, non-symmetrical square, sawtooth, ramp and random noise. These waves can be modified by passing them through a filter, combining one or more into a single wave and/or amplitude limiting. Conveniently, a read-only memory (ROM) can be used as a source of waves. Each wave can represent a different compromise between security and playability problems. For instance, a square wave will show bright dashed retrace lines on many television receivers, but a sine wave of the same amplitude and frequency will show shorter and not such bright lines because of its rounded peak.

Optionally the amplitude of the inserted wave can be made less in the earlier portions of the vertical blanking region, to reduce the retrace line problem, and be at full amplitude in the later lines where signals such as VITS frequently reside.

It will be appreciated that although the following description refers to video signals in accordance with the NTSC standard, the invention is not limited in its application to signals in accordance with that standard and may be applied to video signals in accordance with other standards, such as the PAL standard.

DETAILED DESCRIPTION

Figure 1:
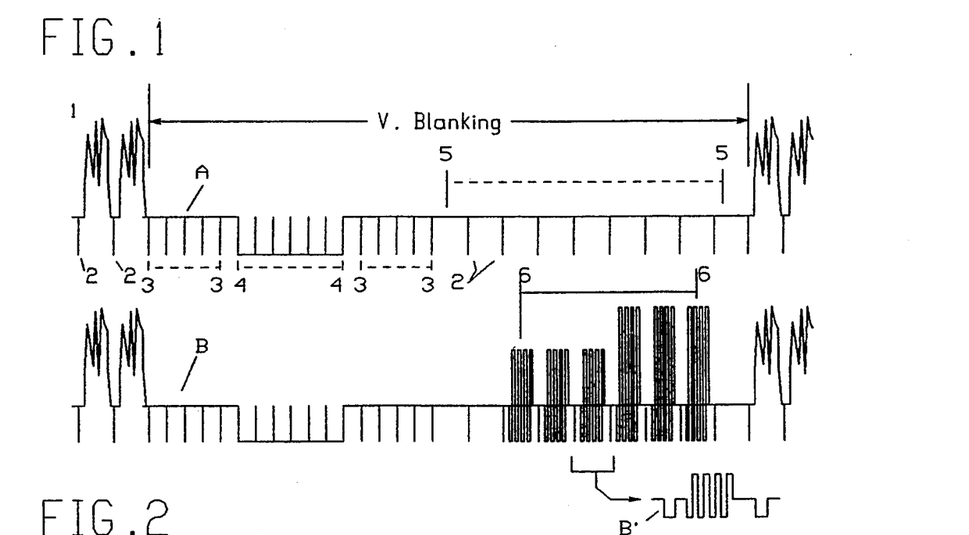
FIG. 1 shows the waveform of a video signal before (waveform A) and after (waveform B) the addition of a sine wave.

While a wide variety of waves may be added to a video signal for the present purposes, the discussion that follows will assume a sine wave. Waveform A shown in FIG. 1 is the waveform of a normal video signal in accordance with the NTSC standard during the vertical blanking interval and for a short time before and after the vertical blanking interval with 1 being picture information at the bottom of the screen, 2 being horizontal sync pulses, 3 being equalizing pulses, 4 being the vertical sync pulses and 5 being blank lines. Waveform B is the waveform of the same signal except that it has been modified by addition of a sine wave 6 to six of the blank lines, between the horizontal sync pulses that occur within the vertical blanking interval. Waveform B' is a horizontally expanded view of one of the blank lines that has been modified.

Figure 2:
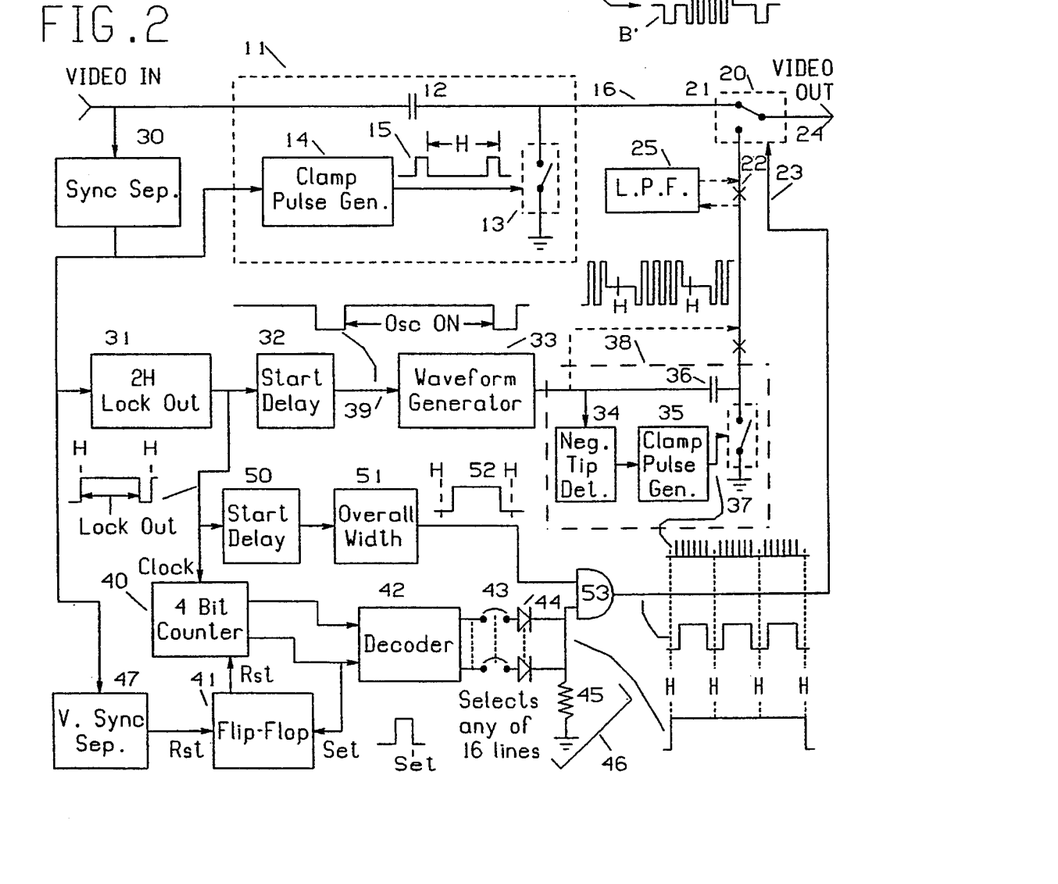
FIG. 2 is a block diagram of one preferred embodiment of the invention.

FIG. 2 shows one preferred form of apparatus for generating a video signal having the waveform B shown in FIG. 1. A video signal in accordance with the NTSC format is received at terminal 10 and applied to sync separator 30, which may be of known design and outputs only the sync portion of the input video signal. The sync portion of the video signal is applied to a vertical sync separator 47, which generates a single vertical sync pulse that is consistently timed relative to the start of the vertical sync time. Input video is also applied to a circuit 11 which establishes the sync tips at a predetermined voltage relative to ground. A wide variety of circuits can provide this function and the well known keyed tip clamp is shown by way of example only. Clamp pulse generator 14 receives separated sync from sync separator 30 and provides a short clamp pulse 15 coincident with the tips of the sync pulses on the incoming video. The clamp pulse is applied to shunt switch 13 which briefly conducts and places the sync tip of the video on line 16 at a predetermined voltage (ground in this case). Thus the video on line 16 is set with its sync tips at a predetermined voltage in preparation for application to switch 20. Switch 20, which has one input terminal 21 connected to line 16, is operative in response to the state of its control line 23 to connect either its input 21 or its input 22 to its output 24. When video on line 16 is to be passed without change to output 24, switch 20 is operated so as to connect its input 21 to its output 24. When the sine wave 6 is to be inserted, control line 23 changes state causing switch 20 to select the input 22 for connection to output 24.

The output of sync separator 30 is also applied to a 2H lockout circuit 31 which removes the double rate pulses found during the equalizing and vertical sync intervals and outputs only pulses representative of the leading edges of the incoming horizontal sync pulses. One well known way to achieve this is to use incoming sync to trigger a one-shot whose timeout is set to be about ¾ of the time between incoming horizontal sync pulses.

A wave generator 33 generates a signal having a sinusoidal waveform and a frequency several times, for example seven to ten times, the horizontal sync frequency. An adjustable one-shot 32 functions as a start pulse generator and provides a start pulse to wave generator 33 on connection 39 in order to ensure that the output wave has a fixed phase relation to horizontal sync and thus occurs at the same time on each line of video. Wave generator 33 therefore generates a continuous wave so long as it is enabled. Other well known techniques can be used to ensure that the wave generator has such a fixed relation to horizontal sync including stopping then restarting the wave generator and injection lock.

By the proper choice of the delay time provided by start delays 32 and 50 it is possible to start the insertion of the added wave just after (or during) the horizontal sync time within either the vertical or horizontal blanking interval.

Switch 20 is controlled by circuitry including a four bit counter 40 which counts horizontal sync pulses occurring after the vertical sync pulse provided by the vertical sync separator. When it reaches a count of sixteen, the most significant bit line will return to the zero state setting flip-flop 41 which disables counter 40 via a reset or enable line (depending on what is available on a specific counter IC). The counter 40 remains disabled until flip-flop 41 is reset by the vertical sync pulse from the vertical sync separator 47.

It will be appreciated by one skilled in the art that the counter 40 counts video lines occurring after the vertical sync pulse. The output of counter 40 is applied to a decoder 42 which provides a separate output for each counter state. The sixteen output terminals of decoder 42 are each connected to OR 46 gate. Diodes 44 and resistor 45 provide the OR function in well known manner. The sixteen lines during which the outputs of decoder 42 are successively asserted constitute an insertion interval. Switches or jumpers 43 can be included to easily set which lines of video within the insertion interval are replaced by the locally generated wave. It will be recognized that the output of OR gate 46 corresponds to the insertion times selected by jumpers 43, but also includes the horizontal sync interval of each line. If such a waveform were used to control switch 20, the output video would be without horizontal sync during the insertion interval.

Adjustable one-shot 50 receives a horizontal sync pulse from 2H lockout 31 and provides a pulse that ends after the sync pulse. The end of the pulse provided by one-shot 50 triggers a second one-shot 51 which outputs a pulse 52. Pulse 52 starts after the end of a first sync pulse and ends before the next horizontal sync pulse, and defines an insertion window within a given video line. Pulse 52 is gated in AND gate 53 with the output of the OR gate 46 to provide waveform 55 which is active only during those intervals that the output of wave generator 33 is to be inserted into the video signal by switch 20.

As shown in FIG. 1 by the enlarged portion of waveform B, the insertion window falls within the active interval of the video line. In general, the delay imposed by variable one-shot 50 and the duration of the insertion window set by one-shot 51 may be such that the insertion window starts after the horizontal sync pulse and ends before the end of the active interval of the video line.

Certain types of wave generators provide an output that starts at ground or other well defined predetermined voltage level. Such outputs can be set to have their negative tips at the same voltage as the clamped video applied to switch input 21 and can be directly applied to input 22 of switch 20. In those cases where the negative tips of the wave generator's output are not at a stable predetermined voltage, it is necessary to perform a DC restoration function on such output. Several well known circuits are able to provide this function. By way of example, the circuit 38 achieves the required DC restoration by detecting the negative tips in block 34 (which is essentially the same as a video sync separator) then developing a brief clamp pulse in clamp pulse generator 35 for application to shunt switch 37 which performs the DC restoration function. The DC restored wave is applied to input 22 of switch 20. Optionally a low pass filter 25 can be inserted in the line between DC restoration circuit 38 and switch 20.

It should be noted that the invention is not limited to the wave generator having a sine wave output and the wave generator in fact could be a free running multivibrator which would then be synchronized to the horizontal sync by resetting it to a known state in response to each start pulse on line 39. The well known type 555 IC is suitable for providing an asymmetrical square wave and has a reset terminal that is well suited for the required synchronization function.

Figures 3A, 3B, 3C, 3D, 3E:
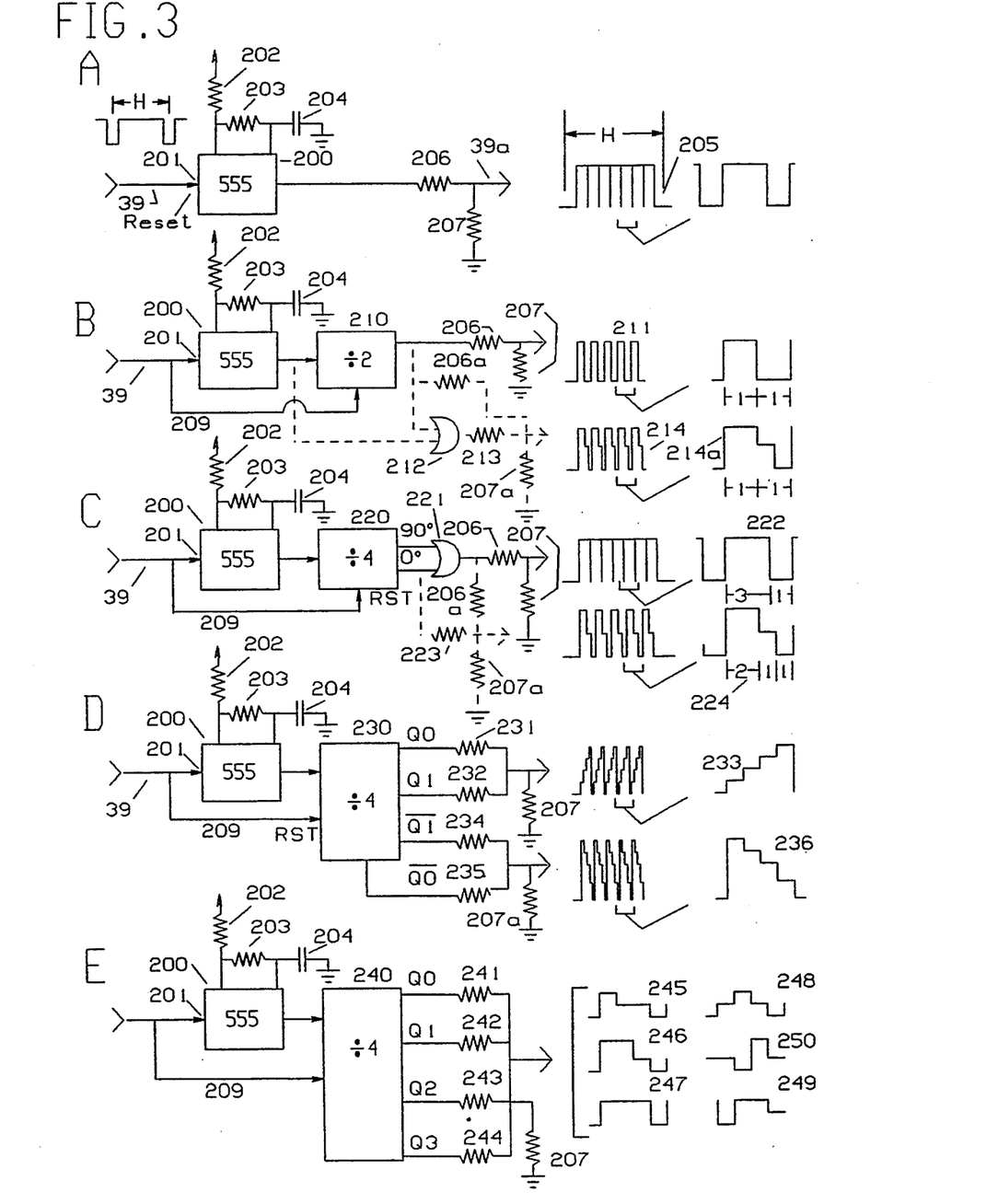
FIGS. 3, 4 and 5 show some waveforms that are useful in understanding the invention.
Figure 4:
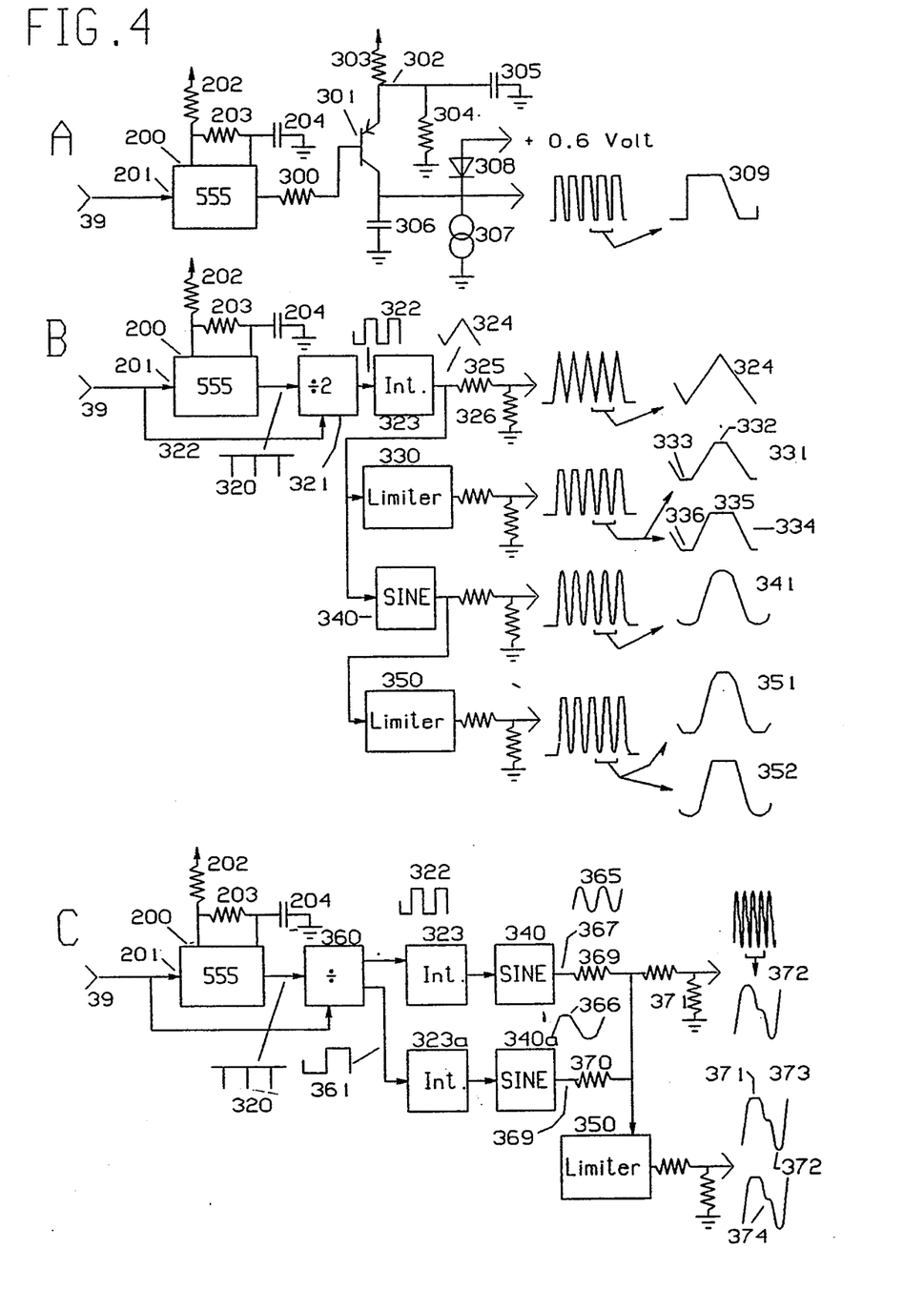
Figure 5:
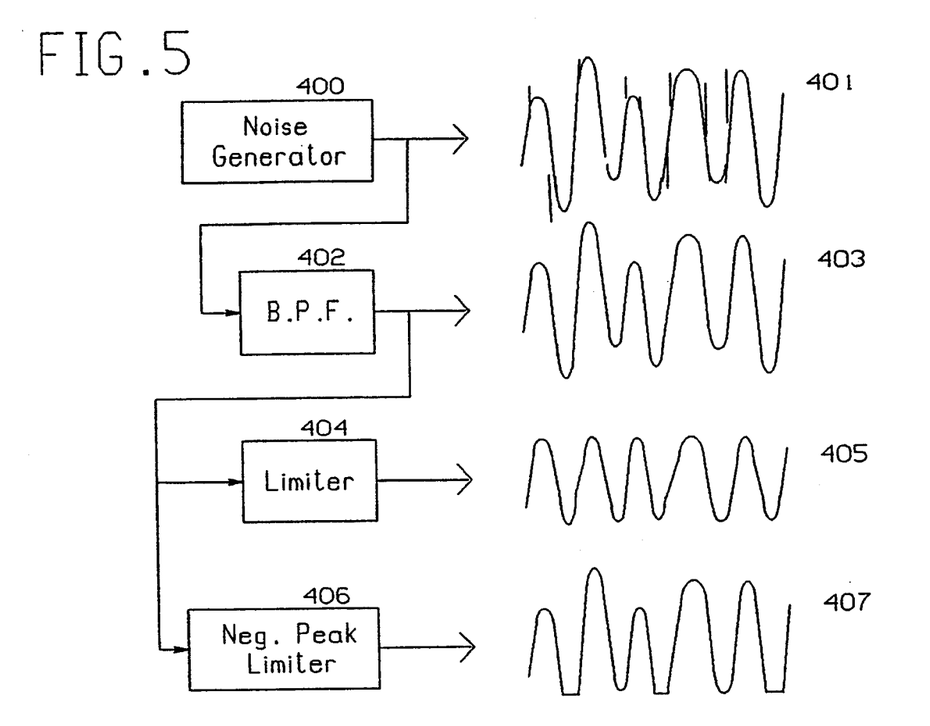

FIGS. 3, 4 and 5 show some of the many possible forms that the wave generator 33 might take. FIG. 3A shows a very simple source of non symmetrical square waves using an oscillator 200 based on the type 555 IC having a reset input at 201 which receives the start pulse from start pulse generator 32 via connection 39. When input 201 goes high, resistors 202 and 203 charge capacitor 204, producing the high portion of output waveform 205. When capacitor 204 reaches an internally set threshold, resistor 203 begins to discharge capacitor 204 producing the low portion of waveform 205. When capacitor 204 reaches the lower internally set threshold, capacitor 204 again charges through resistors 202 and 203 producing continuous oscillations until they are stopped by the signal applied to reset input 201 going low. The output of oscillator 200 is nominally from ground to almost the positive supply voltage, which is well above the usual video level that appears on input 21 of switch 20. A voltage divider made up of resistors 206 and 207 sets the output peak to peak voltage of waveform 205 equal to that of the video at input 21 of switch 20.

FIG. 3B shows that a square wave 211 can be generated by adding a divide by two flip-flop 210 between the output of the oscillator 200 and the voltage divider 206, 207. Connection 209 resets flip-flop 210 so that it starts at the same state on each line of video. FIG. 3B also shows in dashed lines that a continuous stepped wave can be generated by use of an OR gate 212 and resistors 206A, 207A and 213 instead of the potential divider 206, 207. The voltage of the step can be set by the ratio of resistors 206A and 213 while the overall amplitude can easily be set by resistor 207A. Nominally resistors 206A and 213 are equal and provide a step at 50% amplitude as shown in waveform 214A.

The circuit shown in FIG. 3C employs a divide by four circuit that provides four square wave outputs that are 90 degrees out of phase to produce a waveform much like that produced by the FIG. 3A circuit without relying on resistor and capacitor values to establish a waveform duty cycle. The divide by four circuit 220, which is of well known type, is driven by the oscillator 200 and two of its outputs are combined using an OR gate 221 to provide waveform 222. Use of resistors 223, 206A and 207A instead of potential divider 206, 207 enables a stepped waveform 224 to be provided. Any one of the outputs of circuit 220 can be used as an alternate connection for resistor 223, which is shown connected to the zero degree output from circuit 220, in order to provide variations on waveform 224. In a like manner various of the four outputs can be connected to the OR gate 221, in place of the connections shown, to provide additional variations on waveform 224.

FIG. 3D shows a circuit for generating continuous stepped waveforms. The above described oscillator 200 is used to drive a binary divide by four 230 which supplies outputs $Q_0$ and $Q_1$ to binary weighted resistors 231 and 232 to create waveform 233. Conversely, inverted outputs NOT $Q_0$ and NOT $Q_1$ and binary weighted resistors 234 and 235 will create waveform 236 which is an inverted version of waveform 233. In each case resistor 207 or 207A allows setting the output voltage as described above.

FIG. 3E shows a more versatile circuit which generates a wide variety of continuous waveforms by selecting the values of four resistors. Divide by four counter 240 is of the type that has four decoded outputs representing each of the input counts 0, 1, 2 and 3. Resistors 241 through 244 sum each of these decoded outputs to a common load resistor 207 and provide various waveforms depending of the values of each resistor. Since each resistor sets the output voltage of a given portion of the output waveform, it is easy to create any desired waveform that has four parts. By way of example, if resistors 242 and 243 have a value exactly one-half that of resistor 241 and resistor 244 is left open then waveform 245 will result. Similarly, by choosing the values of resistors 241 through 244 waveforms 246 through 249 can be created.

Ramp waveforms can be generated by the circuit of FIG. 4A, which uses the above described oscillator 200 in conjunction with a voltage source 302 comprising a voltage divider made up of resistors 303 and 304 and capacitor 305. The output of oscillator 200 is connected through resistor 300 so as to turn on transistor 301 during those times when capacitor 204 is discharging thus causing capacitor 306 to charge up to a voltage set by voltage source 302. During times when capacitor 204 is charging, transistor 301 is cut off and capacitor 306 discharges through current source 307 in a linear manner until diode 308 becomes conductive, producing waveform 309. The duration of the high portion of waveform 309 is set by resistor 203 and capacitor 204 while the duration of the low portion is set by capacitor 306 and the magnitude of the current provided by current source 307. Voltage source 302 is chosen so that the output peak to peak voltage matches that of the video present at terminal 21 of switch 20. Diode 308, which sets the voltage of the flat negative portion of ramp 309, is ideally connected to a source of voltage equal to its internal voltage drop. Additionally diode 308 can be implemented by any one of several well known "active diode" circuits which will clamp at ground level. Other well known ramp generating circuits may be used.

Sawtooth and sine waves may be generated by the circuits of FIG. 4B. An oscillator 200 as described above generates an asymmetrical square wave 320 for application to divide by two circuit 321 which supplies a symmetrical square wave 322 for application to integrator 323 which supplies a sawtooth wave 324. As in the FIG. 3 circuits, resistors 325 and 326 set the peak-to-peak voltage to match the video applied to input 21 of switch 20, but unlike the previous circuits, the negative tips of the output of the integrator are not necessarily at ground and are subject to drift necessitating further DC restoration by circuit 38 of FIG. 2. If desired, the sawtooth wave may be passed through a limiter 330 which will establish flat tops 332 and bottoms 333 on the sawtooth waveform 331. Optionally the limiting may be non-symmetrical producing a waveform 334 with wider tops 335 than bottoms 336. A sine wave 341 can be produced by applying the sawtooth wave to a sawtooth to sine converter circuit 340. The sine waveform 341 may be limited by a limiter 350 producing waveform 351 or 352. As was the case for the sawtooth waveforms, the sine waveform will usually require further DC restoration.

FIG. 4C shows a circuit for generating a signal having a desired waveform by summing two or more sine waves. An oscillator 200 as described above supplies an asymmetrical square wave to counter 360 which provides two square wave outputs 322 and 361, 361 being at one-half the frequency of 322. Wave 322 is passed through integrator 323 and sine converter 340 to produce a sine wave 365. Similarly, wave 361 is integrated by 323A and converted into a sine wave 366 by sine converter 340A. Either of the two sine waves may be optionally phase shifted by adding a well known phase shift circuit at point 367 or 368. Resistors 369 and 370 sum the two sine waves to form wave 372. Various shapes can be created by the choice of phase shift and the values of resistors 369 and 370. Resistor 371 allows adjustment of the peak to peak amplitude of wave 372 so as to match the video level at input 21 of switch 20. If desired, wave 372 may be passed through a limiter 350 so as to provide flat tops 371 and/or flat bottoms 372 on the output waveform 373. The limiting need not be symmetrical as shown by the asymmetrically limited wave 374.

FIG. 5 shows a circuit for creating a signal having a random waveform. Noise generator 400 can be any of several well known circuits for generating a random noise signal 401. Although wave 401 can be added directly to the video signal, it may instead be processed in band pass filter 402 to produce a filtered noise wave 403 prior to addition to the video signal. It may also be desirable to limit the amplitude of the filtered noise by use of a limiter 404 to produce limited noise wave 405. As shown the limiter is "soft" allowing rounded tips on the waveform. Alternatively, the filtered noise may be applied to a negative peak limiter 406 that provides a limited noise wave 407 with only the negative tips limited so that they can more easily be matched to the negative tips of the sync on the incoming video signal.

Figure 6:
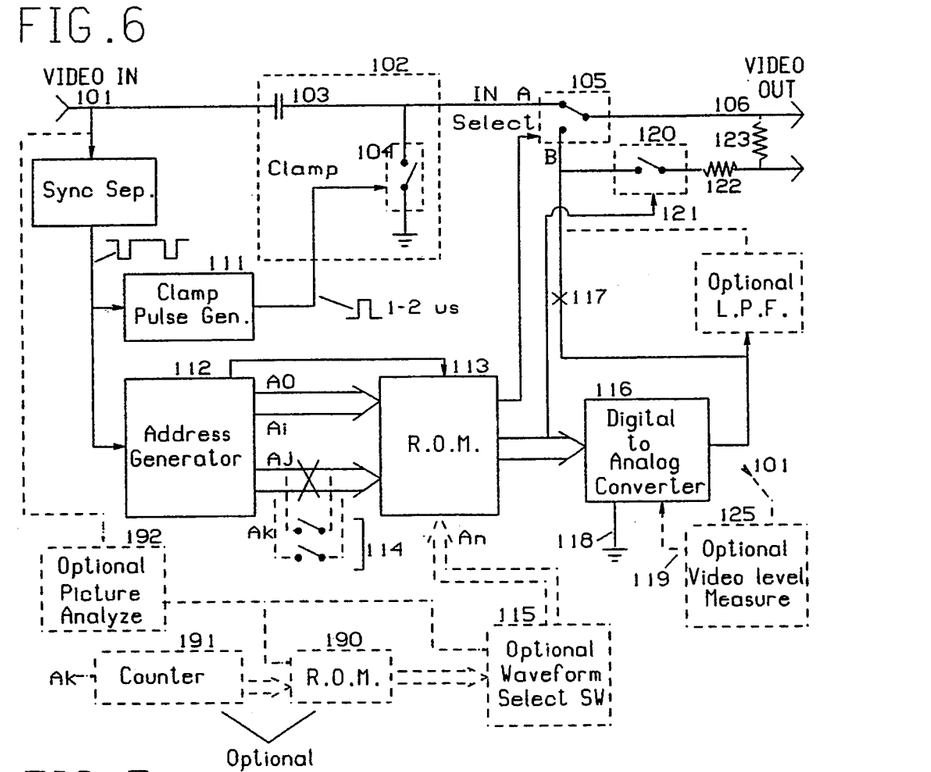
FIG. 6 is a schematic diagram of a second embodiment of the invention.

Referring now to FIG. 6, video is received at terminal 101 and applied to a DC restoration circuit 102. Many suitable DC restoration circuits are known. By way of example, circuit 102 is shown as including a shunt clamp 104 arranged to clamp the DC level of either the sync tip or the back porch to a predetermined voltage, which is shown as ground for purposes of illustration. The DC restored video is applied to a two input switch 105 which selects either the video input or the output of a digital-to-analog converter (DAC) which supplies the continuous waveform for insertion into the video signal. The output of switch 105 provides the output of the overall processor at 106.

Sync separator 110 supplies the sync only portion of the input video signal. Clamp pulse generator 111 supplies a narrow (1-2 us) pulse in response to each sync pulse. This pulse will coincide with the sync tip if clamp pulse generator 111 is triggered from the leading edge of sync. Alternatively, the pulse will coincide with the back porch if it is triggered from the trailing edge of sync. The choice of leading or trailing edge of sync depends on the specific application. If one is inserting a waveform whose most negative part is coincident with sync tip, then one must use sync tip clamping. If one is inserting a waveform that does not extend below blanking then one can clamp at back porch.

Address generator 112 receives sync and supplies address words to ROM 113. By way of example, the ROM 113 might have 8K storage locations, each able to store an eight bit data word and addressable with a thirteen bit address word. Although many variations are possible, one preferred arrangement is to have X address bits $A_0$ to $A_i$ select successive points across one line of video, then higher order Y address bits $A_j$ to $A_k$ select successive lines. This has the advantage of being able to separately address each line in the region of interest allowing the inserted waveform to be different, i.e. of a different amplitude, frequency or wave shape, for each line. Additionally, since each line is separately stored, any line can be enabled or disabled by the optional line select switches 114. In the case of the example, the X address may comprise the eight lowest bits and the Y address the five highest bits, allowing the ROM to store 32 lines of video each containing 256 pixels. The highest order address lines might be provided not by the address generator 112, but by an optional waveform select switch 115. For example, in the case where the ROM stores 32 lines and the switch 115 has four states, the two highest bits of the address word might be provided by the switch 115, allowing switch 115 to select one of four sets of eight lines depending on its state.

It should be noted that the wave generator comprising ROM 113 and DAC 116 can output a wave of any desired amplitude up to the full scale of the DAC. This allows insertion of a continuous wave of any amplitude from zero to full scale. A wave of less than full scale amplitude may be used to avoid generating strongly visible side effects which might otherwise result from adding a wave to blanking. Additionally, if the inserted wave is flat (at a fixed voltage level), it effectively removes any pre-existing wave, such as continuous waves, pulses, and codes, regardless of the purpose for which the pre-existing wave was provided. Moreover the wave supplied from the wave generator need not start at zero (or sync tip) level. For instance, a sine wave whose range is from blanking (or any other level) to peak white (or any other level) can be inserted.

ROM 113 contains digital data which represents the desired insertion wave in the well known manner of having the bit pattern at each storage address represent the instantaneous voltage of the desired output wave (after conversion to analog). Thus the waveform of the output wave may be of virtually any shape including those shown in FIG. 3, 4, 5, 9, 10 and 11. By choosing when the select bit applied to switch 105 is active, one can choose the beginning and end of the insertion interval at will. As before, it is possible to start the insertion of the added wave during the horizontal sync time within either the vertical or horizontal blanking interval.

Optionally, switch 115 can be replaced by a second ROM 190 which is addressed by a counter 191 which counts pulses from any convenient source such as the highest order bit $A_k$ from address generator 112 which is asserted once per field. If ROM 190 is a 128K×8 device, it will allow 131072 fields which occupy about 36 minutes to be counted, allowing a 36 minute cycle (or "pattern") of selecting various sets of added waveforms in ROM 113. Optionally several such patterns can be stored in ROM 190 and selected by some of the address lines through switch settings or other well known means. Also, to reduce the ROM requirements, some of the low order outputs of counter 191 can remain unused. For example, if the first six outputs of the counter are not used then the ROM address will step on every sixty-fourth input count or about once per second.

Figure 8:
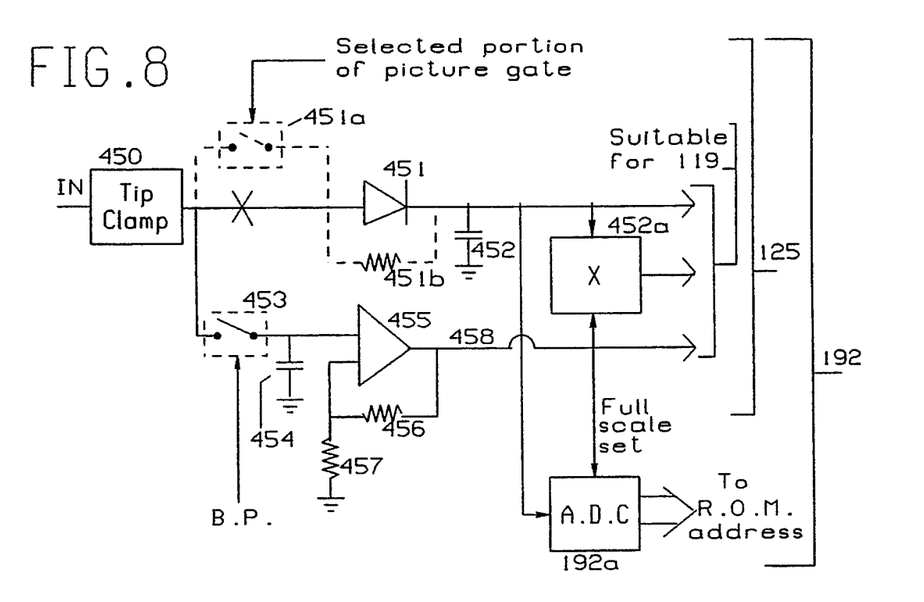
FIG. 8 illustrates a picture analyzer that can be included in the processor shown in FIG. 6, FIGS. 9A and 9B show addition of alphanumeric text to the video display.

An optional picture analyzer 192, one generalized version of which is shown in FIG. 8, can monitor certain video parameters and select appropriate sets of waves in ROM 113 or patterns of waves in ROM 190 to add to the video signal. For instance, since retrace lines show more readily in a dark scene than in a bright scene, a set of waves that does not go all the way to 100% amplitude may be advantageously selected during dark scenes and another set that goes to 100% may be selected during bright scenes. Another example would be to use a pattern of alternation between a 100% amplitude and a 10% amplitude set of added waves only during bright scenes in order to reduce the visibility of the resulting visible pulsing that some television sets exhibit in response to such alternations.

Additionally ROM 190 and associated circuitry can be used to select between the addition of a wave and no addition of any wave on a regular basis by merely alternatively selecting a set of lines carrying a wave and a set of lines that carry only a fixed level or that has the select bit set to the non-select state. Such a pattern can be used to provide a video signal with only certain portions of it being un-copyable. This can be used to deceive someone into believing that a successful copy has been made if only the beginning and the end of the recording are checked.

Although switch 105 could be operated in a manner similar to switch 20 of FIG. 2, it is conveniently operated from one bit of the ROM output to allow complete freedom in choosing where the inserted wave begins and ends. The remaining output bits from ROM 113 are a binary representation of the wave that is stored in the ROM and can be applied to DAC 116 which provides the actual wave. Note that the DAC zero reference terminal 118 is set to a potential that matches the voltage set by clamp circuit 102. Further, the DAC full scale reference voltage applied to 119 can optionally be derived from the input video amplitude in circuit 125 (described below) such that the inserted wave will change as a function of some characteristic of the input video, and may be arranged to follow any changes that might occur in the video input amplitude. An optional low pass filter 117 smoothes the waveform outputted by the DAC. It should be noted that some waves, such as a square wave, do not require the DAC and filter and can be achieved by merely connecting any one ROM output bit line directly to input B of switch 105. Other simple waveforms can be created by resistive mixing as described with reference to FIGS. 3 and 4.

Switch 105 allows the output of DAC 116 to be selected instead of the video signal provided at terminal 101 when the select output of ROM 113 is active. Alternatively, one bit of the output from ROM 113 can be applied to the control terminal 121 of an optional switch 120 to sum the output from DAC 116 with the output video signal by means of summing resistors 122 and 123 in which case 124 becomes the output.

FIG. 8 shows one form of picture analyzer that may be used when it is desired to vary the amplitude of the added wave in response to the inputted video signal. The sync tips of the input video are clamped by sync tip clamp 450, which is functionally the same as clamp 102 of FIG. 6. The peak voltage of the video is rectified by diode 451, which can be a conventional semiconductor junction diode or any well known "active diode", charging capacitor 452 to the peak video voltage. The peak video output provides the signal that may be applied to DAC 116 at terminal 119 of FIG. 6. Optionally a simple switch 451A can be placed in series with diode 451 to measure the video level only during certain parts of the picture. For example, sampling during the top ⅓ of the picture would reduce the amplitude of the added wave when the top of the picture is dark and most prone to retrace lines being visible. Another simple modification is to replace diode 451 with resistor 451B to produce average video instead of peak video. For independence from picture content, the tip clamped video's back porch voltage level can be sampled by switch 453, which closes only during an interval just after horizontal sync, and held by capacitor 454. According to the NTSC standard, this voltage is 40/140 of the peak video level. Operational amplifier 455 is set to a gain of 2.5 times by resistors 456 and 457 in order to output at terminal 458 a voltage equal to the peak video as implied by the sync amplitude. The modified peak video output produces the signal required at terminal 119 by DAC 116. Combining circuit 452A can be included so as to have the maximum wave amplitude follow sync amplitude, but reduce on dark scenes.

A simple version of picture analyzer 192 of FIG. 6 can be implemented in FIG. 8 by driving analog to digital converter (ADC) 192A with the output from diode 451 or resistor 451B. Optionally the output of amplifier 455 can be used to set the full scale of the ADC in order to automatically track any changes in the applied video level.

Figure 7:
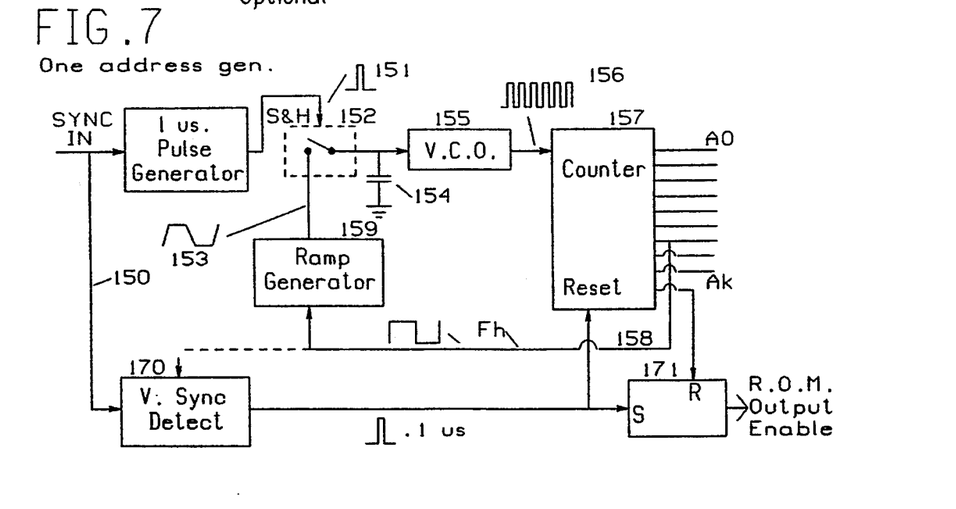
FIG. 7 shows part of the embodiment that is illustrated in FIG. 6.

FIG. 7 illustrates one possible form of address generator 112. Sync is received on line 150 from a sync separator such as 110 of FIG. 6. The leading edge of sync is used to generate a narrow sampling pulse 151 which causes switch 152 to sample a ramp 153, which is provided by ramp generator 159, and supply the sampled level to hold capacitor 154. The voltage on capacitor 154 controls the frequency of the voltage controlled oscillator 155 which supplies an output 156 suitable for counting by binary counter 157. Binary counter 157 has outputs from each stage which are used as address lines for the ROM. The choice of oscillator frequency determines the number of samples in the ROM wave which makes one line of video. The higher this frequency the more fine details are available in its output wave, but at the cost of requiring a larger ROM for a given number of video lines. Assuming 512 samples per line of video, the VCO would operate at 512 times the horizontal scan frequency or about 8 MHz. One output 158 of the counter corresponds to the horizontal scan frequency and is supplied to ramp generator 159 which provides an output signal 153 having a trapezoid waveform suitable for application to the sample switch 152. It should be noted that a selector switch under the control of one or more lines from optional ROM 190 could select which of $A_0$ through $A_k$ are used as the output 158 thus setting the number of samples per line dynamically. In such a case one could use any one of several well known digital phase detectors with associated wide range VCO in the address generator 112.

Binary counter outputs of a higher order than the horizontal scan frequency represent video line select addresses to the ROM in the familiar binary sequence. One can choose the ROM size and VCO frequency such that a large number of lines can be held in the ROM, i.e. if one uses a 128K×8 bit ROM, 512 lines of 256 samples each are available.

It is convenient to have count 0 (the start of the first video line stored in ROM) be one of the vertical sync pulses, since this allows the vertical sync detector 170 to directly reset the binary counter 157 without delay circuitry. It will, however, be appreciated that this convenience may come at the expense of ROM space, since it is then necessary to include in the ROM data that begins at the vertical sync time. Such data may occur too early in the field to be used for modifying the video signal. If it is desired to replace other portions of the video signal outside of the lines directly following vertical sync, well known methods can be used to have the counter start at any chosen line of the incoming video.

If the counter or ROM is of less length than one field, the ROM must be disabled after a complete set of lines have been read out once in any given field. This is conveniently achieved by a simple flip-flop 171 which is set at the start of the vertical sync and reset when the counter reaches full count (or a count equal to one ROM cycle). The output of flip-flop 171 then serves as an enable for the ROM although it could be used in other ways such as an overriding select input to switch 105 that prevents the insertion of any waveforms into the video.

Figure 9A:
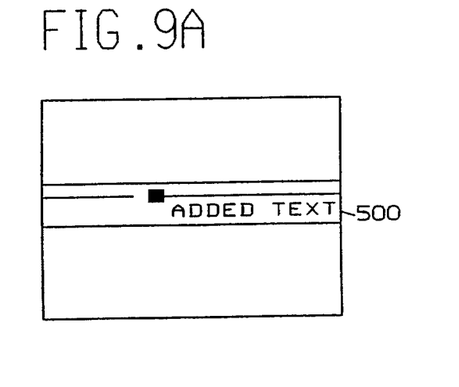
Figure 9B:
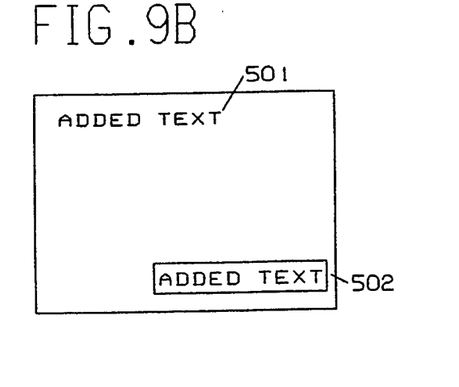

It should be noted that the ROM contents can include data that appears as text in the vertical interval of the video field. The text can then be made visible if the vertical hold on a television set is adjusted so as to bring this region into view as shown at 500 in FIG. 9A. FIG. 9B shows that text 501 and 502 can be inserted into the active picture interval of the video field if the start address of the ROM is offset or if the ROM stores many lines of video. Such text might include, for example, a serial number unique to a particular ROM, a company brand name, a tape duplication lab's name or a producer's name.

Figure 10A:
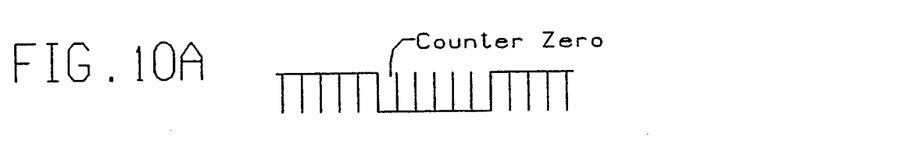
FIGS. 10A and 10B show a possible modification to vertical sync pulses of a video signal.
Figure 10B:
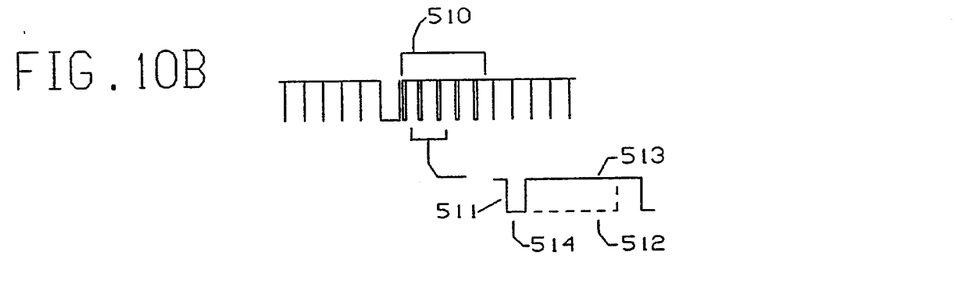

FIG. 10A shows a portion of the waveform of a typical video signal centered about the six "broad" vertical synchronizing pulses, while FIG. 10B shows a modified form of the same signal that has blank video, from the ROM, inserted at 510, at approximately the blanking level producing shortened vertical sync pulses. Waveform 511 shows one original vertical sync pulse 512 in dashed lines and the added section 513 which results in a shorter pulse 514. In this fashion, an anticopy wave similar to that disclosed by Janko in U.S. Pat. No. 4,213,149 can be generated.

Figure 11A:
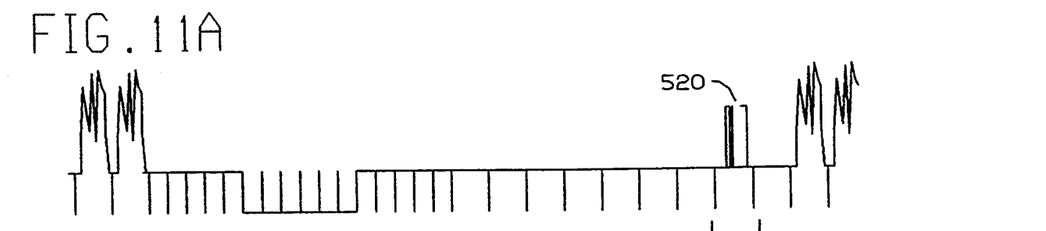
FIGS. 11A and 11B show addition of coded data to the active interval of a blank line during the vertical interval.
Figure 11B:
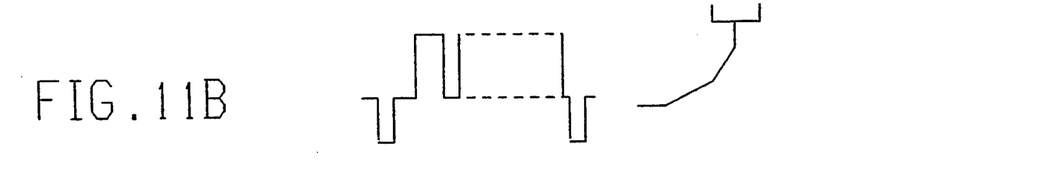
Figure 12A:
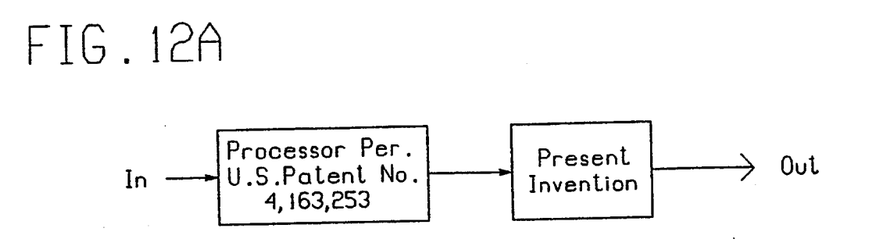
FIG. 12 shows a two-stage video processor that combines both a processor in accordance with the present invention and a processor of known type.
Figure 12B:
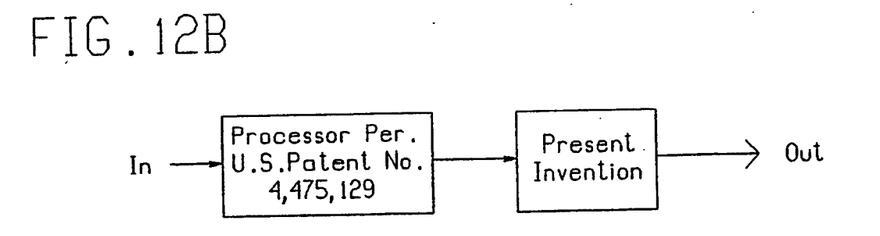
Figure 12C:
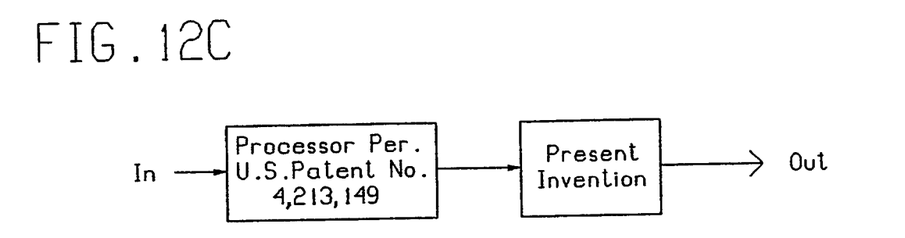
Figure 12D:
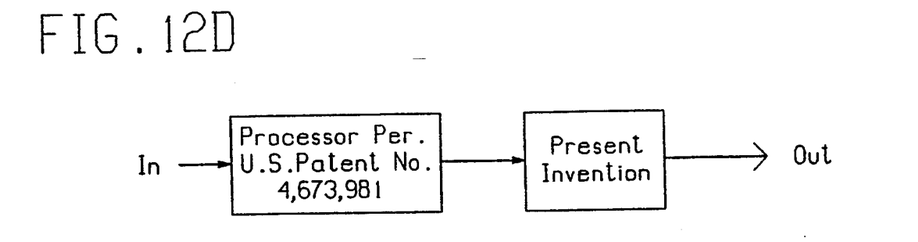

The ROM can also be used to generate short pieces of vertical interval time code, closed captions, teletext and the like for many purposes, such as testing decoders. FIG. 11A shows the waveform of a video signal after insertion of such code at 520 on one line, while FIG. 11B shows that line in more detail.

As shown in FIG. 12, a processor embodying the invention may be used in conjunction with a processor for implementing one or more previously known methods of copy protection by connecting the processor downstream of a second processor that implements the process disclosed by in at least one of U.S. Pat. No. 4,163,253 (Morio), U.S. Pat. No. 4,475,129 (Kagota), U.S. Pat. No. 4,213,149 (Janko), or U.S. Pat. No. 4,673,981 (Lippman). It should be noted that the ROM based version of the present invention can itself generate all of the above anti-copying signals except that described in U.S. Pat. No. 4,673,981 and accordingly one or more of these processors can be integrated into one. It is then possible to alternate between the various methods or to use one or more simultaneously. Alternation between the various methods merely involves selecting a different set of patterns at different times as was described above.

A particularly useful result can be achieved by using the picture analyzers disclosed above to improve the playability of the video signal produced by the apparatus disclosed by U.S. Pat. No. 4,631,603. This may be achieved by using the Video Level Measuring block 125 and/or the Picture Analyzer 192 and, using well known methods, controlling the amplitude and/or width of the "AGC" and/or "Pseudo-sync" pulses referred to in U.S. Pat. No. 4,631,603 in response to input video. Additionally if apparatus similar to that of FIG. 6 is used instead of that shown in U.S. Pat. No. 4,631,603, the apparatus becomes easier to modify when new playability problems are found, since only the ROMs need be changed.

Anti-copy processes involve a compromise between playability and security since they inherently produce a non-standard video signal. Systems involving adding waves to a video signal generally produce one or more of the following symptoms: 1) Visible retrace lines due to television receiver designs based on the vertical interval being blank. 2) Bending at the top of the screen due to the negative tips of the wave going through the sync circuits and affecting the phase-locked loop that controls the horizontal scan. 3) Darkening of the picture due to the positive tips of the added wave being interpreted as the back porch of sync and thus falsely being used as the black reference. If the added wave alternates between a high peak voltage and a low peak voltage, then a blinking picture may result. 4) Vertical jitter due to the tips of the added waves going through a television set's sync separator and integrating to a value large enough to affect the vertical sweep.

Each of these problems will be treated in turn:

Visible retrace lines can be reduced by keeping the positive peak amplitude of the added wave to a somewhat low value, especially during the early parts of the vertical blanking interval. One implementation may have the positive peaks at 50% for the early lines and at 100% in the later lines of the vertical blanking interval. The transition between the early and late lines can be either gradual or abrupt. Additionally one can choose a sine wave, which has a rounded top in place of a square wave with its broad flat top.

Bending at the top of the screen is caused by the tips of the added wave disturbing the horizontal phase locked loop. This can be controlled by choosing the placement of the wave within each line of video. For instance if the added wave occurs at the middle of each line of video, one would expect a minimum disturbance, since the false samples will be equally distributed about the center of the retrace of the wave that the television set's PLL samples, producing a sampled voltage that is essentially equal to the normal voltage from normal samples. To the extent that the television set's internal waveform is non symmetrical, the added wave can be moved off center to optimize its playback on any given type of television set. Additionally the width of the negative tips and/or the frequency of the added wave can be adjusted so that at least some television receivers will not interpret the negative tips as sync pulses.

Darkening of the picture can best be controlled by keeping the negative tips of the added wave narrow enough (by raising the frequency of the added wave or by other means) that they are invisible to the television set's circuitry. Additionally one can restrict the positive peak amplitude or width of the added wave. Placement in the early portions of the vertical blanking interval will reduce the effect on some television sets. Blinking effects can be controlled by the above steps as well as by optimizing the rate of blinking such that many television receivers ignore the alternations while most VCRs are still affected.

Vertical jitter can be controlled by placing the added wave away from vertical sync, especially avoiding the region before the vertical sync. Additionally, the sum of the widths of the tips of the added wave, in any group of a few lines, should be kept as small as possible to reduce the possibility that they will integrate to a high enough voltage to affect the vertical sweep circuits.

Since the waveform of the added wave can be selected to have particular features, the added wave can be tailored to minimize the side effects exhibited by a particular design of television receiver when it receives a composite video signal that has been modified by inclusion of the added wave.

It will be appreciated that the invention is not restricted to the particular embodiments that have been described, and that variations may be made therein without departing from the scope of the invention as defined in the appended claims and equivalents thereof.

I claim:

1. A method for processing a video signal so as to inhibit the making of acceptable videotape recordings therefrom, wherein the video signal has a blanking interval which includes a sync pulse, said method comprising the steps of:

generating multiple cycles of a continuous anti-copying waveform which includes negative peaks and whose positive peak amplitude is greater than the voltage of said sync pulse;

setting the negative tips of said sync and said negative peaks of said anti-copying waveform at the same voltage which includes clamping the negative tips of said synch to said same voltage; and inserting said anti-copying waveform into said video signal following said synch pulse, and within said blanking interval, such that the negative tips of said continuous anti-copying waveform are at the same voltage as said negative tips of sync whereby said added continuous anti-copying waveform confuses the automatic gain control of a videotape recorder so as to produce an unacceptable video recording.

2. A method in accordance with claim 1 where said blanking interval is the vertical blanking interval.

3. A method in accordance with claim 1 where said blanking interval is an inserted blanking interval with a duration at least equal to one line of video.

4. A method in accordance with claim 1 where said continuous waveform is a sine wave.

5. A method in accordance with claim 1 where said continuous waveform has substantially flat bottoms.

6. A method in accordance with claim 1 where said continuous waveform has substantially flat tops.

7. A method in accordance with claim 1 where said continuous waveform has substantially flat bottoms and where the rising and falling edges are linearly sloping.

8. A method of inserting an anti-copying waveform into a video signal comprising the steps of:
   generating a continuous anti-copying waveform which has negative peaks and positive peaks;
   maintaining said negative peaks of said continuous anti-copying waveform at a voltage substantially equal to the sync tip voltage of said video signal while said positive peaks are at a voltage equal to or substantially greater than the blanking level of said video signal, said negative peaks of said continuous anti-copying waveform being clamped to a voltage equal to the sync tip voltage; and
   inserting said continuous anti-copying waveform between the horizontal sync pulses of said video signal;
   so as to output a video signal including an inserted waveform which prevents the making of an acceptable video recording of said video signal.

9. A method as in claim 8 where said insertion step is performed by switching during selected portions of the vertical blanking interval of said video signal so as to insert said waveform during at least part of the interval between adjacent horizontal sync pulses of at least one line.

10. A method as in claim 8 where said generating a continuous anti-copying waveform step digitally reads said waveform from information stored in a read only memory.

11. A method of inserting an anti-copying waveform into a video signal comprising the steps of:
   generating a continuous anti-copying waveform which has negative peaks and positive peaks;
   maintaining said negative peaks of said continuous anti-copying waveform at a voltage substantially equal to the sync tip voltage of said video signal while said positive peaks are at a voltage equal to or substantially greater than the blanking level of said video signal; and
   inserting said continuous anti-copying waveform between the horizontal sync pulses of said video signal;
   so as to output a video signal including an inserted waveform which prevents the making of an acceptable video recording of said video signal;
   wherein the generating a continuous anti-copying waveform step can generate more than one insertion waveform, with at least one group of said waveforms being the same below said blanking level and differing only at amplitudes above said blanking level.

12. A method as in claim 11 where the selection of one of said waveforms at any given time is controlled by the content of said video signal.

13. A method of inserting an anti-copying waveform into a video signal comprising the steps of:
   generating a continuous anti-copying waveform which has negative peaks and positive peaks;
   maintaining said negative peaks of said continuous anti-copying waveform at a voltage substantially equal to the sync tip voltage of said video signal while said positive peaks are at a voltage equal to or substantially greater than the blanking level of said video signal; and
   inserting said continuous anti-copying waveform between the horizontal sync pulses of said video signal, wherein said insertion step sums said continuous waveform with said video signal;
   so as to output a video signal including an inserted waveform which prevents the making of an acceptable video recording of said video signal.

14. A method of inserting an anti-copying waveform into a video signal comprising the steps of:
   generating a continuous anti-copying waveform which has negative peaks and positive peaks wherein said positive peaks are at a voltage that is varied in amplitude in response to the content of said video signal;
   maintaining said negative peaks of said continuous anti-copying waveform at a voltage substantially equal to the sync tip voltage of said video signal while said positive peaks are at a voltage equal to or substantially greater than the blanking level of said video signal; and
   inserting said continuous anti-copying waveform between the horizontal sync pulses of said video signal;
   so as to output a video signal including an inserted waveform which prevents the making of an acceptable video recording of said video signal.

15. A method of generating and inserting multiple connected cycles of an anti-copying waveform, with negative tips at a predetermined level, into a video signal between horizontal sync pulses comprising the steps of:
   generating a reset signal derived from the horizontal sync of said video signal;
   generating multiple cycles of a continuous wave, in accordance with said reset signal, at a frequency greater than the frequency of said horizontal synch and with an amplitude equal to or greater than the sync amplitude of said video signal;
   frequency dividing said continuous wave and logically combining said frequency divided outputs to provide a non-symmetrical square wave; and
   inserting the non-symmetrical square wave as an anti-copying waveform into said video signal between horizontal sync pulses such that the negative peaks of said waveform are at the same voltage as the negative tips of said horizontal sync;
   so as to output a video signal including an inserted waveform which prevents the making of an acceptable video recording of the video signal.

16. A method as in claim 15 further comprising the step of logically mixing one or more results of said frequency divider step with one or more results of said logically combining step so as to provide a non-symmetrical waveform as said anti-copying waveform with more than two amplitude levels.

17. A method of inserting an anti-copying signal into a video signal between horizontal sync pulses comprising the steps of:
   providing horizontal sync in response to said video signal;

supplying a reset signal derived from said horizontal sync;

generating a rectangular wave at a frequency greater than the frequency of said horizontal sync, in the absence of said reset signal;

integrating said rectangular wave to produce a waveform with at least one sloped edge; and inserting said waveform into said video signal;

so as to produce a video signal that cannot be recorded on an ordinary video tape machine without severe degradation.

18. A method as in claim 17 where the integrating step produces a rectangular wave with a step positive edge and a ramp negative edge.

19. A method as in claim 17 where the result of said integration step is that both positive and negative edges of said sloped waveform are ramps.

20. A method as in claim 17 further comprising the step of limiting so as to provide a continuous anti-copying waveform with flat tops and bottoms.

21. A method as in claim 17 further comprising the step of filtering said integrated waveform for converting said integrated waveform into a sine wave so as to supply a sine wave.

22. A method as in claim 21 further comprising the step of limiting the sine wave so as to supply a clipped sine wave.

23. A method as in claim 17 further comprising:

two or more steps of sine wave conversion filtering of the integrated waveform, wherein the filters are harmonically related for providing respective sine waves of harmonically related frequencies; and a mixing step for mixing harmonically related sine waves so as to supply a sine wave with added harmonics.

24. A method as in claim 23 further comprising the step of limiting the sine wave with added harmonics so as to provide the wave with flat bottoms.

25. A method of producing and inserting an anti-copying signal between horizontal sync pulses of a video signal comprising the steps of:

generating a random noise signal;

limiting said random noise by clipping the negative peaks of the said noise, so as to supply a noise signal with negative peaks at a predetermined level; and inserting said noise signal into said video signal between horizontal sync pulses such that the negative peaks of said noise signal are at the same voltage as the negative tips of said horizontal sync;

so as to output a video signal including an inserted waveform which prevents the making of a normal video recording of the video signal.

26. A method as in claim 25 where said limiting step limits both negative and positive peaks so as to provide a noise signal with both the negative and positive peaks at predetermined levels.

27. A method of adding an insertion signal to a video signal so as to inhibit the undesired copying thereof, comprising the steps of:

generating an insertion waveform having negative peaks and positive peaks;

setting the level of the sync tips of said video signal and the negative peaks of said insertion waveform to a predetermined voltage difference between said sync tips and said negative peaks; and combining said insertion waveform and said video signal in a manner such that said negative peaks of said insertion signal are at the same voltage as said sync tips and the positive peaks of said insertion waveform are at a level substantially above the blanking level of said video signal;

so as to output a video signal which produces a recording of substandard quality when recorded by an ordinary video tape recorder.

28. A method as in claim 27 where said waveform generation step generates more than one connected cycle of a continuous insertion waveform.

29. A method of inserting an anti-copying waveform into a video signal, comprising the steps of:

generating an anti-copying insertion signal;

measuring at least one parameter of the picture portion of said video signal;

varying at least one parameter of said insertion signal in response to said measurement; and inserting said parameter adjusted anti-copying signal into said video signal between the horizontal sync pulses of said video signal so as to produce an uncopyable video signal with reduced visible artifacts.

30. A method as in claim 11 where the selection of any one of said insertion waveforms is done in a sequential manner.

31. A method for processing a standard video signal in which the horizontal blanking interval includes a horizontal sync pulse having a tip at a negative potential relative to the blanking level and the vertical blanking interval includes a succession of blank lines in which the potential during the active line interval remains substantially at the blanking level, said method comprising including an insertion signal whose potential varies between a lower level that is substantially at the sync tip level and an upper level that is substantially above the blanking level in the video signal during the active line interval of at least a first blank line and a second blank line, the first blank line being earlier in its field than the second blank line, and the upper level of the insertion signal being higher in the second blank line than in the first blank line.

32. A method according to claim 31 wherein the first and second blank lines are in the same field of the video signal.

33. A method according to claim 31 wherein the sync tip level can be represented by −40 voltage units, the blanking level by zero voltage units, and the voltage potential of the insertion signal varies continuously between −40 voltage units and +100 voltage units.

* * * * *